Sept. 22, 1942.   G. E. DONALDSON   2,296,507
VEHICLE LIFTING DEVICE

Filed Nov. 21, 1941

Inventor
Glen E. Donaldson
by Orwig & Hager
Attys

Patented Sept. 22, 1942

2,296,507

UNITED STATES PATENT OFFICE 2,296,507

VEHICLE LIFTING DEVICE

Glen E. Donaldson, Laurens, Iowa

Application November 21, 1941, Serial No. 419,947

1 Claim. (Cl. 294—82)

In lifting the front end of a truck or other vehicle to dump its contents it is customary to attach chains or hooks to the wheel hubs or axle, or to the upper part of the wheel rims between the spokes. This in many instances scratches or mars the enamel and, hence, is objectionable.

The object of my invention is to provide a lifting device of this character which engages the vehicle only upon the outer surface of the tires, thereby avoiding all possibility of marring the enamel, and further to provide a device of this character which may be readily and quickly applied and removed, and which is readily and quickly adjusted to wheels and tires of various sizes, and in which the wheels are firmly and securely held.

Figure 1:
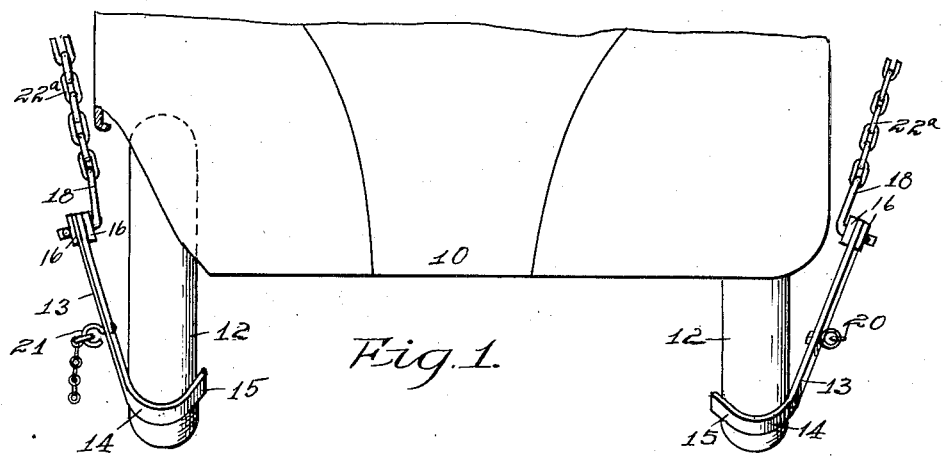
Figure 1 shows a front view of a part of a truck having my improved lifting device applied thereto.
Figure 2:
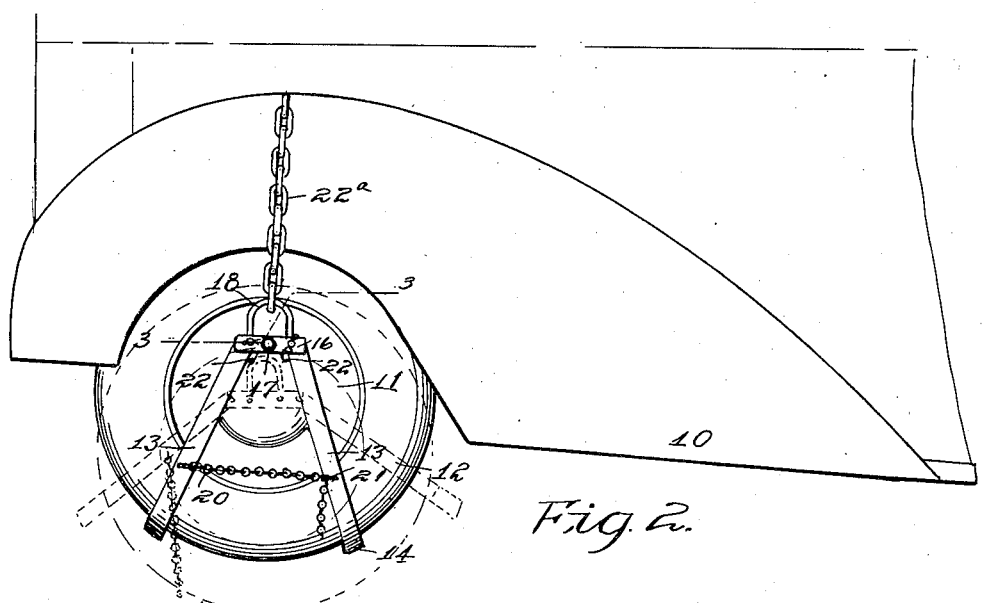
Figure 2 shows a side view of one of my improved wheel supporting devices applied to a tire; the dotted lines show the arms swung outwardly away from each other.
Figure 3:
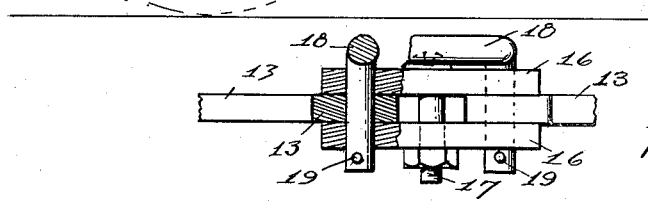
Figure 3 shows an enlarged detail sectional view on the line 3—3 of Figure 2.

I have used the reference numeral 10 to indicate the vehicle, 11 the wheels, and 12 the pneumatic tires.

The tire engaging member comprises two arms 13 having their lower ends curved inwardly at 14 and then upwardly at 15 and being of a size to freely receive the larger truck tires. The upper ends of the arms 13 extend between two bars 16 which are held together by a bolt 17. A metal loop 18 extends upwardly from the side of the inner bar 16 and has its end portions extended outwardly through both bars 16 and the arms 13, with pins 19 in the ends thereof, to form pivotal supports for the arm 13 and to hold the bars 16 in place.

At the outer central portion of one of the arms 13 is a metal loop to which a chain 20 is attached, and on the other arm 13 is a hook 21 to enter one of the links of the chain to limit the spreading movement of the arms. Lugs 22 limit their inner movement.

In practice, the operator spreads the arms 13 apart, then extends the curved lower ends thereof under the wheel tire, one at each side of that part of the tire which rests upon the roadway, and finally attaches the chain to the hook 21, then the chains 22a may be elevated and the vehicle will be lifted. The curved arms will not move inwardly toward each other when the vehicle is lifted because they engage upwardly curved portions of the tire. When the vehicle is lowered to the roadway, the curved end portions of the arm will be out of road engaging positions and, hence, may be easily moved toward each other for the release of the chain from the hook 21.

During this entire operation no part of the lifting device engages any part of the vehicle except the tires, hence, cannot mar its finish.

In practice, I have found that an operator may perform a complete operation of lifting, dumping and lowering a vehicle much more readily and quickly than with other lifting devices.

I claim as my invention:

A vehicle lifting device, comprising a top member comprising an upwardly extended loop having its ends extended outwardly, two bars having said ends extended through them, a bolt for holding the bars in adjusted position, two arms having their upper ends extended between said bars and having said loop end portions extended through them to serve as pivotal supports therefor, the lower ends of said arms being shaped to extend downwardly at the outer side of a vehicle wheel and each having at its lower portion a tire engaging member curved to extend under a wheel tire and then upwardly at the inner side thereof, and means for limiting the outward movement of the lower ends of the arms away from each other, comprising a chain attached to the central portion of one of the arms and a hook in the other arm.

GLEN E. DONALDSON,